United States Patent
Hou et al.

(10) Patent No.: US 9,372,676 B2
(45) Date of Patent: Jun. 21, 2016

(54) METHOD AND SYSTEM FOR LOADING STATUS CONTROL OF DLL

(71) Applicant: INTERNATIONAL BUSINESS MACHINES CORPORATION, Armonk, NY (US)

(72) Inventors: Rui Hou, Beijing (CN); Zhi Yu Liu, Beijing (CN); Huayong Wang, Beijing (CN); Yan Qi Wang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 48 days.

(21) Appl. No.: 14/075,664

(22) Filed: Nov. 8, 2013

(65) Prior Publication Data

US 2014/0068575 A1 Mar. 6, 2014

Related U.S. Application Data

(63) Continuation of application No. 12/607,241, filed on Oct. 28, 2009, now Pat. No. 8,589,896.

(30) Foreign Application Priority Data

Oct. 29, 2008 (CN) .......................... 2008 1 0170786

(51) Int. Cl.
*G06F 9/44* (2006.01)
*G06F 9/45* (2006.01)
(Continued)

(52) U.S. Cl.
CPC .............. *G06F 8/41* (2013.01); *G06F 9/44521* (2013.01); *G06F 9/44594* (2013.01); *G06F 8/37* (2013.01); *G06F 9/30058* (2013.01)

(58) Field of Classification Search
CPC ....... G06F 8/41; G06F 8/447; G06F 9/45516; G06F 9/443; G06F 9/44521; G06F 9/44594; G06F 9/44578; G06F 8/37; G06F 9/30058
See application file for complete search history.

(56) References Cited

U.S. PATENT DOCUMENTS 6,002,868 A * 12/1999 Jenkins et al. ................ 717/105
6,263,376 B1    7/2001 Hatch et al.
(Continued)

OTHER PUBLICATIONS

Symantec Endpoint Protection 11.0, Application and Device Control, 2008, pp. 1-18.*
(Continued)

*Primary Examiner* — Thuy Dao
*Assistant Examiner* — Mongbao Nguyen
(74) *Attorney, Agent, or Firm* — Tutunjian & Bitetto, P.C.; Jennifer R. Davis

(57) ABSTRACT

Apparatus and methods are provided for controlling the loading status of DLLs. Specifically, a streaming program compiler is provided. The compiler includes operation modules for calling DLLs during streaming program execution; association table generating units for generating association tables according to user-defined rules, where the association table includes entries indicating (i) stream branches of the streaming program and (ii) an operation module corresponding to the stream branches; and a trigger generating unit for generating a trigger based on user-defined rules, where the trigger generating unit (i) determines which conditions for loading and unloading DLLs fit the streaming program, (ii) matches these conditions to a particular stream branch to identify a matched stream branch, and (iii) sends out triggering signals indicating the matched stream branch. This invention also provides a corresponding method and controller.

17 Claims, 5 Drawing Sheets

(51) Int. Cl.
*G06F 9/445* (2006.01)
*G06F 9/30* (2006.01)

(56) References Cited

U.S. PATENT DOCUMENTS

| | | | | |
|---|---|---|---|---|
| 6,665,866 B1* | 12/2003 | Kwiatkowski | ............ | G06F 8/41 717/144 |
| 6,698,015 B1* | 2/2004 | Moberg | ............ | G06F 9/44521 717/141 |
| 6,708,330 B1* | 3/2004 | Moberg | ............ | G06F 9/44521 711/118 |
| 6,769,126 B1* | 7/2004 | Pekowski | ............ | G06F 9/44521 717/127 |
| 2001/0034736 A1* | 10/2001 | Eylon et al. | ................... | 707/200 |
| 2003/0021282 A1* | 1/2003 | Hospodor | ..................... | 370/401 |
| 2003/0208520 A1* | 11/2003 | Hewitt | ................ | G04F 9/4411 718/102 |
| 2004/0003068 A1* | 1/2004 | Boldman et al. | ............. | 709/223 |
| 2004/0111723 A1* | 6/2004 | Moles | ................. | G06F 9/44521 717/171 |
| 2004/0194068 A1* | 9/2004 | Warren | .................... | G06F 8/41 717/136 |
| 2005/0108694 A1* | 5/2005 | Ramani | .................. | G06F 8/427 717/143 |
| 2005/0125687 A1* | 6/2005 | Townsend | ............... | G06F 21/55 726/26 |
| 2005/0246693 A1* | 11/2005 | Plum | .................. | G06F 11/3624 717/140 |
| 2006/0026584 A1* | 2/2006 | Muratori | ............ | G06F 9/44521 717/163 |
| 2008/0133891 A1* | 6/2008 | Salz et al. | ...................... | 712/220 |
| 2008/0134158 A1* | 6/2008 | Salz et al. | ...................... | 717/148 |
| 2008/0134221 A1* | 6/2008 | Dadiomov | .......... | G06F 9/44521 719/331 |
| 2008/0163185 A1* | 7/2008 | Goodman | ........... | G06F 9/44521 717/151 |
| 2008/0178298 A1* | 7/2008 | Arai et al. | ....................... | 726/29 |
| 2008/0201568 A1* | 8/2008 | Quinn | ................ | G06F 9/44521 713/1 |
| 2008/0235731 A1* | 9/2008 | Bryant et al. | ................... | 725/44 |
| 2008/0301719 A1* | 12/2008 | Roberts | ............... | G06F 9/44521 719/331 |
| 2009/0235284 A1* | 9/2009 | Steventon | ................. | G06F 8/65 719/328 |
| 2009/0249311 A1* | 10/2009 | Dandamudi | ........ | G06F 9/45504 717/139 |
| 2009/0249312 A1* | 10/2009 | Liao | ......................... | G06F 8/41 717/140 |
| 2010/0077411 A1* | 3/2010 | Comer | ............... | G06F 9/44521 719/331 |
| 2010/0218174 A1* | 8/2010 | Schneider | ................. | G06F 8/41 717/148 |
| 2010/0293532 A1* | 11/2010 | Andrade | ............ | G06F 11/1438 717/140 |
| 2012/0005661 A1* | 1/2012 | Johnston | ............ | G06F 9/44521 717/148 |
| 2012/0324484 A1* | 12/2012 | Fried | ................... | G06F 9/44521 719/331 |

OTHER PUBLICATIONS

The MathWorks, MATHLAB Compiler, The language of Techinical Computing, 2002, pp. (1-10) to (1-15) and (4-1) to (4-13).*
C. E. McDowell, Unloading Java Classes That Contain Static Fields, 1998, pp. 56-60.*
Wei Qin, A Multiprocessing Approach to Accelerate Retargetable and Portable Dynamic-compiled Instruction-set Simulation, 2006, pp. 1-6.*
Vijay Sundaresan, Experiences with Multi-threading and Dynamic Class Loading in a Java Just-In-Time Compiler, 2006, pp. 1-11.*
D. Wang, QA—On Process, Threading, and DLL Lifetimes, http://w3-4u.blogspot.com/, Dec. 20, 2006.

* cited by examiner

| T1  | -2, -4 |
| --- | --- |
| T2  | -8, -(1,7) |
| All | 1,2,3,4,5,6,7,8, (1,2),(1,7) (2,3), (3,4), (3,8), (4,5), (6,7),(7,3) |

METHOD AND SYSTEM FOR LOADING STATUS CONTROL OF DLL

CROSS-REFERENCE TO RELATED APPLICATION

This application is a Continuation application of allowed co-pending U.S. patent application Ser. No. 12/607,241, filed on Oct. 28, 2009, which in turn claims priority under 35 U.S.C. §119 to Chinese Patent Application No. 200810170786.6 filed Oct. 29, 2008, both of which are incorporated herein by reference in their entirety.

BACKGROUND OF THE INVENTION

1. Field of the Invention

The present invention relates to the field of streaming applications and dynamic linked libraries (DLL). More particularly, the present invention relates to a method and an apparatus for controlling the loading and unloading of dynamic linked libraries in a streaming application.

2. Description of Related Art

The dynamic linked library is a library comprising data and computer code that can be used simultaneously by a plurality of programs. In present operation systems, many functions are provided by dynamic linked libraries (DLLs). For example, in the Windows operation system, the dialog box related functions are executed by the Comdlg32 DLL. Therefore, any program can use the functions in this DLL to "open" a dialog box. In addition, many functions of application running on the operation system can also be provided by DLLs. For example, a certain application can include a plurality of different modules with each module being included in and distributed from DLLs.

Advantages of using DLLs include facilitating the modularization and reuse of computer code, improving the effective usage of memory and reducing the occupied disk space. Therefore, the operation system and programs can be loaded and run faster as well as use less disk space.

Currently, DLLs are loaded by the operating system when the DLL is first called and unloaded when the calling program ends or when the memory is needed. However, in most streaming applications, the main program is usually running constantly. This loads a large number of DLLs during the main program's lifetime and uses a large amount of memory. This problem is compounded by the fact that streaming program languages currently do not support branch structures which enable conditional loading and unloading of certain DLLs. This leads to streaming programs being unable to properly control the loading and unloading of DLLs from memory. Since the operating system can only determine when a program has ended, the operating system is unable to determine whether a DLL called by a running program needs to be unloaded. This leads to several problems. First, these Blind-Running DLLs can take hundreds of mega bytes in memory space. This leads to DLLs being left in memory unused which is an inefficient use of system resources. Second, these DLLs must be constantly monitored by the operating system in order to ensure proper execution of the system. Therefore, a solution for managing the loading and unloading of DLLs is needed which would improve the usage efficiency of system resources.

SUMMARY OF THE INVENTION

In view of above problems, the present invention provides a method, a compiler and a system for properly controlling the DLL loading status.

According to an aspect of the present invention, a streaming program compiler for compiling a streaming program is provided. The compiler includes: an operation module for calling a dynamic link library (DLL) during execution of the streaming program; an association table generating unit for generating an association table according to a user-defined rule, where the association table includes an entry indicating (i) a stream branch of the streaming program and (ii) an operation module corresponding to the stream branch; and a trigger generating unit for generating a trigger based on the user-defined rule, where the trigger generating unit (i) determines which condition for loading and unloading dynamic link libraries fits the streaming program, (ii) matches the condition to a particular stream branch to identify a matched stream branch, and (iii) sends out a triggering signal indicating the matched stream branch.

According to a second aspect of the present invention, a controller for controlling the loading status of a DLL in a streaming program is provided. The controller includes:

an operation module determining unit for referencing an association table in response to receiving a triggering signal indicating a stream branch to determine an unnecessary operation module which corresponds to the stream branch where the association table has recorded correspondence between a stream branch and the unnecessary operation module; and a DLL controlling unit for unloading a DLL called by the unnecessary operation module where the streaming program has an operation module for calling a DLL during execution of the streaming program.

According to a third aspect of the present invention, a method of controlling the loading status of a DLL in a streaming program is provided. The method includes the steps of: calling by an operation module the DLL during the execution of the streaming program; receiving, by a receiving unit, a triggering signal identifying a stream branch; determining, by a determining unit, an unnecessary operation module which corresponds to the stream branch by referring to an association table that has recorded correspondence between the stream branch and the unnecessary operation module; and unloading, by an unloading unit, a DLL called by the unnecessary operation module thereby freeing at least a portion of a system's memory.

With the use of the apparatus and method according to the present invention, users can control the loading status of DLLs as desired by defining the controlling logic or rules of DLLs within a streaming program thereby obtaining improved computing resources.

DETAILED DESCRIPTION OF THE PREFERRED EMBODIMENTS

Figure 1:
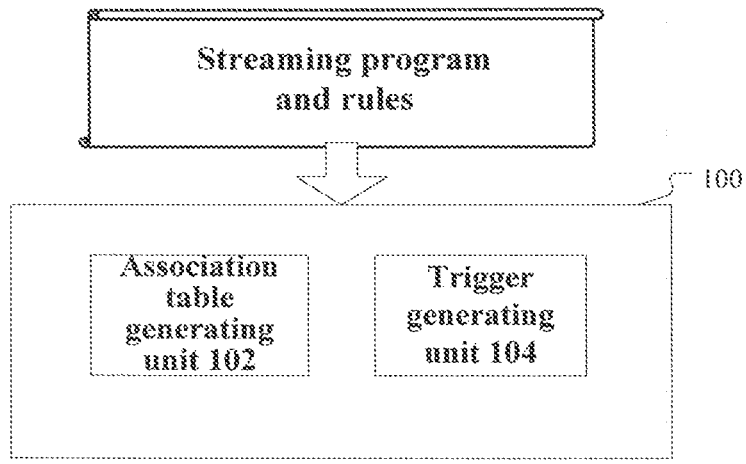
FIG. 1 shows the block diagram of the compiler system according to one embodiment of the present invention.

To properly control the loading and unloading of DLLs, the DLL's control logic (e.g. which DLLs should be active/unloaded and the condition for loading or unloading these DLLs) must be known. Since DLL designers can not predict how their DLLs will be used, they can not accurately describe the DLL control logic in current applications and operating systems. Only application designers or programmers who use the DLL can accurately describe the DLL control logic. Therefore, only the application designer or programmer can define the DLL control logic of a specific DLL. However, for streaming applications, current programming languages do not support branch structures such as comparison, judgment and selection on various conditions. Therefore, the programmer can not define the conditions and control logic of loading or unloading DLLs using current streaming programming languages.

Currently, there are many streaming programming languages used by streaming applications such as SPUR, Cg, Baker, Spidle, StreamIt, StreamC/KernelC, Brook, and Sequoia. These streaming programming languages differ from each other by using different characteristics like different stream data types and stream levels. In general, a streaming program is comprised of a plurality of operation modules similar to the filters in StreamIt. Each operation module performs certain operations on the input data stream, and thus generates an output data stream. In order to perform certain operations, one operation module can invoke one or more DLLs.

Using StreamIt as an example, an illustration of the basic features of a streaming programming language is provided as follows. StreamIt is a programming language based on a multicore (e.g. Raw Architecture Workstation) architecture which is a subset extension of Java. In StreamIt, the processing procedure of a streaming processor is seen as a respective single-input and single-output computing module filter. The stream itself is seen as a data path connecting each filter. A plurality of filters can construct a communication network which is mapped into each Tile to be executed in parallel by using pipeline, splitjoin and feedbackloop structures.

Due to the process flow of stream processing, current programming languages do not support branch structures. However, the DLL control logic between each operation module involved in the streaming program must be known in order to manage DLLs in streaming applications.

In view of the above problems, there is provided an apparatus and a method as embodiments of the present invention that can (i) compile and interpret the DLL control logic defined by a user (e.g. the programmer) within the streaming programming language when compiling the code, (ii) monitor the DLL loading and unloading conditions during the streaming program execution stage according to the DLL control logic; and (iii) execute the corresponding loading or unloading operations when conditions are met. This will give users flexibility when managing DLLs in streaming applications.

FIG. 1 shows the block diagram of the compiler system according to one embodiment of the present invention. The compiler is marked with reference number "100" in the figure. As shown in FIG. 1, the compiler 100 comprises an association table generating unit 102 and a trigger generating unit 104.

The association table generating unit 102 is configured to generate an association table according to at least one rule defined by the user. The association table includes (i) at least one entry, with each entry indicating a stream branch of the streaming program and (ii) at least one operation module corresponding to the stream branch.

The trigger generating unit 104 is configured to generate at least one trigger according to the at least one rule defined by the user. The triggers are used to judge which conditions fit the streaming program, map the condition to a stream branch, and generate a triggering signal indicating the stream branch. As described above, the association table and the triggering signal are all generated based on interpreting the user-defined rules. The user-defined rules can be called control rules which are defined using a streaming programming language for a streaming program or application. The control rules are used to describe the DLL control logic based on which DLLs are called in the streaming application. The process of (i) calling DLLs within streaming applications and (ii) using control rules is illustrated below.

Figure 2:
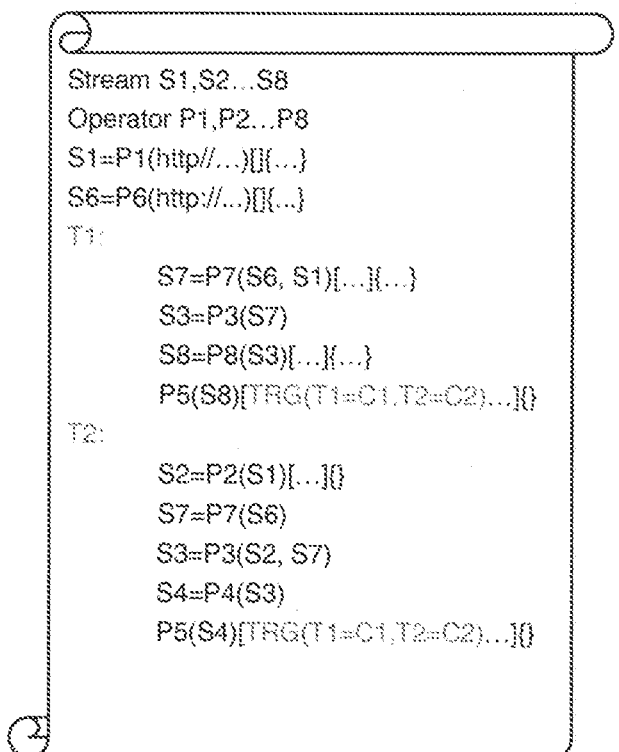
FIG. 2 shows a section of exemplary streaming program codes according to one embodiment of the present invention.
Figure 3:
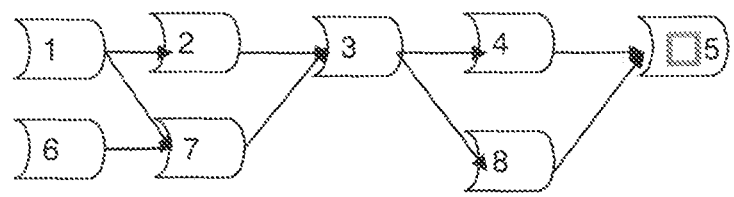
FIG. 3 shows the operation modules involved in the streaming program shown in FIG. 2.

The following illustrates the definition of control rules in connection with a section of exemplary codes. According to an embodiment of the present invention, FIG. 2 shows a section of exemplary streaming program codes which include the definition of DLL control rules defined by the user. FIG. 3 illustrates the operation modules involved in the streaming program shown in FIG. 2. As shown in FIG. 2 and FIG. 3, the exemplary streaming program involves 8 operation modules P1-P8, denoted by reference numbers 1-8 respectively in FIG. 3. The data stream output from these operation modules are marked as S1-S8, respectively. For simplicity, it is assumed that each operation module needs to call a DLL during execution, which is denoted as DLL1-DLL8, respectively. These operation modules are connected to each other according to a certain logic sequence, and thus construct a stream program. The connection between the operation modules are shown as directional lines in FIG. 3, and described in a special format in streaming programming language in FIG. 2. In normal streaming programs, the connection between each operation module complies with a Directed Acyclic Graph (DAG). Specifically, in the streaming programming language shown in FIG. 2, the relation between operation modules and data stream are represented in below format:

output data stream=operation module (input data stream) [modification to the operation module]{ }

Therefore, Sn=Pn(Sm)[ ]{ } means that the data stream Sm output from operation module Pm is the input data stream of operation module Pn, and then flow out as data stream Sn after the operation and processing of Pn. This means the operation module Pm is connected to Pn. Using such format, users can describe the flow direction of data stream, and therefore construct a complete streaming program. In addition, the above format can also be adopted to define the logic between operation modules, namely the control rules of DLLs.

The codes shown in FIG. 2, beginning from T1, represent the control rules defined by users. In the FIG. 2 code, numerous operation modules and their connections are shown. In addition, the definition for different branches, the conditions for each branch and the triggers for monitoring the condition are also shown. Specifically, T1 represents the first stream branch, and T2 represents the second stream branch. The sentences after T1 and T2 define the flow direction of data stream between the operation modules respectively in the first and second branches. By using the key word "TRG", the last sentence in each branch describes the condition for following the branch and the corresponding trigger. Specifically, under condition C1, the streaming program runs according to the first branch T1; and under condition C2, the streaming program runs according to the second branch T2. In addition, "TRG" is written in [ ] after operation module P5 thus functioning as further modification and limitation to operation module P5. Namely, the trigger is embedded in P5. Therefore, the judgment and triggering of the condition will be performed every time when operation module P5 is executed in the streaming program.

It can be understood that the above streaming program can be realized by adopting any other of the existing streaming programming languages. In above exemplary codes, the control logic and operation module rules are defined with a section of script in the main program by the user. However, in other embodiments, the above rules can also be described by the user in a separate file using streaming program language. In the process of describing the control rules, the user can define the stream branches, the condition for the branches and the trigger as desired, not limited to the example given in above exemplary codes. For example, the user can give a detailed definition of C1 and C2 (e.g. C1 is A>B, C2 is A<B) in which A and B are two variables in the operation module P5. When the fulfillment of one condition depends on the internal data in a certain operation module, the trigger used to judge the fulfillment of the condition is usually embedded into the certain operation module, as shown in the exemplary code shown in FIG. 2.

In other embodiments, the user can also define a trigger outside the operation modules, e.g. TRG(T3=throughput( )>5 GBPS). It can be understood that this trigger is defined independently instead of being written in the explanation field of any operation module to be embedded into the operation module. According to the definition of the trigger, there is a new stream branch T3 which will be executed when the condition throughput( )>5 GBPS is satisfied. Therefore, the trigger can be used to both monitor data output and trigger the streaming program to run according to T3 stream branch when output is more than 5 GBPS.

Once the rules are defined by the user, the association table generating unit 102 generates an association table based on the rules to indicate each stream branch and the operation module involved in the stream branch. Below is an illustration of the generation of the association table using the same exemplary codes shown in FIG. 2.

First, an analysis is performed on the definition of the first branch. The definition of the first branch is:

T1:
S7=P7 (S6, S1) [ . . . ]{ . . . }
S3=P3 (S7)
S8=P8 (S3) [ . . . ]{ . . . }
P5 (S8) [TRG(T1=C1,T2=C2) . . . ]{ }

Figure 4A:
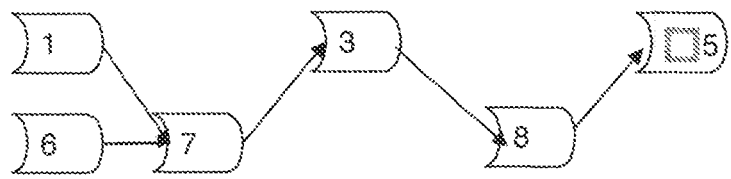
FIG. 4A shows the connection of the operation modules in the first branch of the streaming program of FIG. 2.

By analyzing the first three sentences, the association table generating module 102 can determine the following: (i) operation module P7 has inputs S6 (the data stream) and S1 (the output from operation module P6); (ii) data stream S7 is then input into operation module P3, and becomes data stream S3; (iii) operation module P8 performs an operation on stream data S3 and outputs data stream S8; and (iv) S8 flows into the operation module P5 with a trigger embedded. Through this analysis, the operation module connection chart for the first branch can be drawn, as shown in FIG. 4A. By comparing FIG. 4A and FIG. 3, the stream branch of FIG. 4A can be obtained by removing operation modules P2 and P4 and all related connections from FIG. 3, which is a connection figure of all operation modules involved in the streaming program. From this, it can be determined that in stream branch T1, there is no need to execute operation modules P2 and P4, which avoids loading any DLLs called by P2 or P4.

Figure 4B:
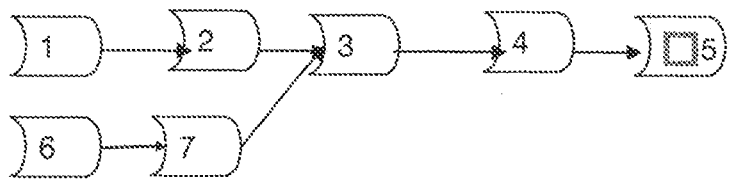
FIG. 4B shows the connection of the operation modules in the second branch of the streaming program of FIG. 2.

Similarly, the chart in FIG. 4B can be drawn through analyzing the definition of the second branch of the rules. It can be seen through comparison of FIG. 4B and FIG. 3 that (i) P8 is an out of operation module and (ii) an additional connection exists between P1 and P7.

Figures 5, 6:
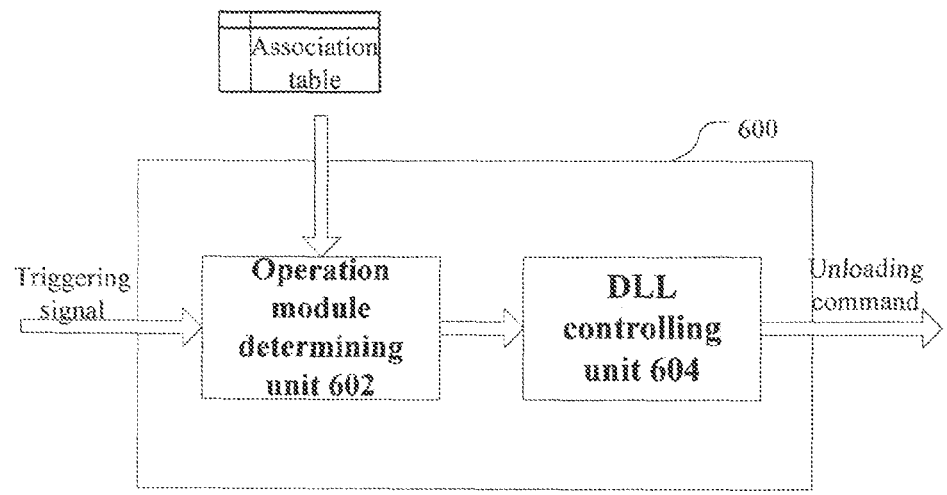
FIG. 5 shows an association table according to one embodiment of the present invention.
FIG. 6 shows the block diagram of the controlling apparatus according to one embodiment of the present invention.

In order to better illustrate the operation modules used by the streaming program under the above stream branch, the association table generating unit 102 shows the correspondence between the stream branch and involved operation modules in the form of a condition association table. FIG. 5 shows an association table according to one embodiment of the present invention. The association table corresponds to the rules defined in the exemplary code shown in FIG. 2. As shown in FIG. 5, there are 3 entries in the association table. The last entry represents all the operation modules involved in the streaming program and the connection relationships between them. Specifically, number 1 represents the operation module P1, and (1, 2) means operation modules P1 and P2 are connected with each other. The first entry of the association table represents the correspondence between the stream branch T1 and the operation modules under this stream branch. In this embodiment of the present invention, −2 and −4 in the association table show that modules P2 and P4 are removed from the operation modules in entry 3 in stream branch T1. Similarly, in the second entry, −8, −(1, 7) represent that stream branch T2 can be obtained by removing operation module P8 and the connecting line between P1 and P7 from the operation modules and connection relationships.

It can be understood that the form of the association table is not limited to what is shown in FIG. 5. For example, in other embodiments of the present invention, a stream branch can be described by listing all of the necessary operation modules instead of those that need to be removed.

In the rules defined by the user, a condition under which the stream branch is triggered is also defined. Therefore, the trigger generating unit 104 needs to (i) generate corresponding triggers, (ii) enable the triggers to determine the conditions suitable for the streaming program according to the user-defined rules, (iii) map the condition into a suitable stream branch, and (iv) issue a triggering signal indicating the stream branch. As with all of the other examples, the trigger generating unit 104 is still using the exemplary code in FIG. 2 as an example to illustrate the trigger generation procedure.

In the code shown in FIG. 2, the user defines a trigger with key word TRG: TRG(T1=C1,T2=C2), and then embeds the trigger into operation module P5. This definition means that once operation module P5 executes, the trigger can judge whether condition C1 and C2 are satisfied or not. If condition C1 is satisfied, a signal SG1 will be triggered to indicate that condition C1 was satisfied, which directs the streaming program to run stream branch T1. If condition C2 is satisfied, a signal SG2 will be triggered which directs the streaming program to run stream branch T2.

However, current normal streaming program languages can not support branch structures. Accordingly, current compilers are not able to read and compile definitions which describe the triggering conditions. In this embodiment of the present invention, the trigger generating unit 104 (i) analyzes the triggering logic defined by the user and (ii) generates code reflecting the triggering logic by using languages which support branch structures in order to implement the trigger functionality. In fact, although streaming program languages can not support branch structures by themselves, operation modules within the streaming program are usually constructed by programming languages such as C/C++ and Java that do support branch structures. For example, StreamIt has operation modules which are constructed in Java. Here, the trigger generating unit 104 can also use Java to write triggering conditions into the operation modules for triggers embedded in operation modules. For example, for the embedded TRG triggers shown in FIG. 2, the trigger condition logic C1 and C2 as well as the corresponding triggering signals SG1 and SG2 can be written into the operation module P5 by using a plurality of "if" sentences. For non-embedded triggers, the trigger generating unit 104 can directly add the trigger condition logic to the main program when compiling the triggering conditions. Thus, the trigger generating unit 104 is able to judge the conditions suitable for the streaming program and to generate corresponding triggering signal when executing the streaming program.

Based on generating the association table and triggers according to user-defined rules during compilation of the streaming program, the operation modules used and DLLs invoked by the streaming program can be controlled during the execution of the streaming program. The direct control of the loading status of DLLs is realized by a controlling apparatus corresponding to the runtime in the operating system.

FIG. 6 shows the block diagram of the controlling apparatus according to one embodiment of the present invention. In the embodiment, the controlling apparatus is embodied as a controller 600. As shown in the figure, the controller 600 includes an operation module determining unit 602 and a DLL controlling unit 604. The operation module determining unit 602 is configured to look up an association table containing the correspondence between the stream branch and the operation modules in response to receiving a triggering signal that indicates the stream branch. The operation module determining unit 602 then determines the operation module corresponding to the indicated stream branch. The DLL controlling unit 604 is configured to unload the DLL called by the unnecessary operation modules according to the operation modules corresponding to the stream branch. Below is using the code in FIG. 2 in conjunction with the association table shown in FIG. 5 to describe the operation of the controller 600.

As described above, the compiler generates the association table and the triggers during the compilation of the streaming program. The association table is usually stored in the buffer of the system. By judging the conditions suitable for the streaming program during the execution stage, the trigger can generate a triggering signal indicating a stream branch. The operation module determining unit 602 then performs an analysis on the triggering signal. Referring to the codes in FIG. 2, if the triggering signal is SG1, stream branch T1 is indicated. Furthermore, the operation module determining unit 602 looks up the association table generated in the compiling stage, (e.g. the association table shown in FIG. 5), and obtains the operation modules and connection relationships involved in the stream branch T1. Specifically, in stream branch T1, the operation modules P2 and P4 no longer need to be compared to all the involved operation modules in the streaming program. Accordingly, DLL2 and DLL4, which are called by P2 and P4 respectively, can be unloaded. The DLL controlling unit 604 can then unload the DLLs called by unused operation modules.

In an embodiment of the present invention, in order to execute the unloading of the DLLs, the DLL controlling unit 604 can send a terminating command to operation modules P2 and P4, and call a unloading function (e.g. dll.close( )), to unload DLL2 and DLL4. These DLLs can also be unloaded by causing operation modules P2 and P4 to call the unloading function themselves. Similarly, if the triggering signal is SG2, the stream branch T2 is indicated. The operation module determining unit 602 can obtain the operation modules corresponding to stream branch T2 by searching the association table. Furthermore, the DLL controlling unit 604 can unload the DLLs called by unused operation modules by sending these modules a terminating command. Therefore control over the DLLs is realized through the user-defined rules.

In an embodiment of the present invention, the controller 600 for directly controlling the loading statuses of DLLs is realized by a section of fixed codes added into the system. This embodiment of the present invention is applicable to receiving a triggering signal in a fixed format, looking up the association table in a fixed form and generating the loading/unloading command in a fixed format. Thus this controller is advantageous for an association table and triggering signal which has a fixed format.

In another embodiment of the present invention, the controller 600 can be generated by compiler 100 while compiling the streaming program and rules. Controller 600 can then directly control the loading status of DLLs during the execution stage. Correspondingly, the compiler 100 can optionally comprise a controller generating unit (not shown) used to generate the controller shown in FIG. 6.

All the above embodiments of the present invention are illustrated in conjunction of the exemplary code shown in FIG. 2. It can be understood that for rules defined in other streaming program languages, those skilled in the art are capable of adopting a similar compiler to compile the rules, generating the association table and triggers, and adopting a similar controller to unload the DLLs corresponding to certain branch according to the association table and triggering signal. However, it is also understandable that the rules, association table and triggering signal can be realized in different forms. Those skilled in the art can design the compiler and controller according to user-defined rules under the teaching of the specification.

Under the same inventive concept, an embodiment of the present invention provides an execution method corresponding to the compiler and controller.

Figure 7:
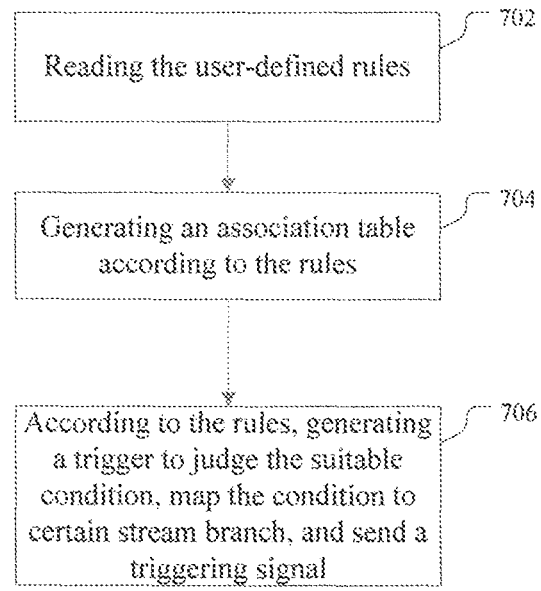
FIG. 7 shows the flow chart describing the compilation of the streaming program according to one embodiment of the present invention.

FIG. 7 shows a flow chart of compiling the streaming program according to an embodiment of the present invention. As shown in FIG. 7, the controlling rules defined by the user using streaming program language are read in step 702. In step 704, according to the controlling rules, an association table is generated to indicate each stream branch and the operation modules corresponding to the stream branch. Specifically, for the streaming program codes shown in FIG. 2, the association table shown in FIG. 5 can be generated by analyzing the controlling rules defined by the user. In FIG. 5, the association table includes 3 entries; each of them shows the operation modules involved in the streaming program and the connection relationship between the operation modules respectively under the circumstances of stream branches T1, T2 and All (without a stream branch).

In step 706, according to the user-defined rules, at least one trigger is generated to (i) judge the conditions suitable for the streaming program, (ii) map the condition into a certain stream branch, and (iii) send a triggering signal indicating the certain stream branch. Specifically, in step 706, by analyzing the controlling logic of the triggers defined by the user, a trigger which reflects the controlling logic is generated. The trigger is created as a section of code using languages that support branch structures. For the triggers that are embedded in the operation module, the controlling logic code is written into the operation module in step 706.

During the execution of the streaming program, the triggers generated through code compilation can judge the conditions suitable for the streaming program and thus generate the corresponding triggering signals. The DLL involved in the streaming program can be controlled when the streaming program is executed based on the generated triggering signal and the association table.

Figure 8:
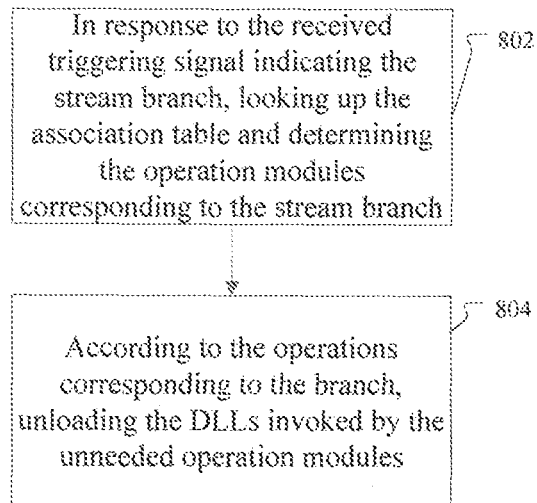
FIG. 8 shows the flow chart of the method for controlling the loading status of DLLs according to one embodiment of the present invention.

FIG. 8 describes a method of controlling the loading status of DLLs according to one embodiment of the present invention with a flow chart. In step 802, a triggering signal indicating a certain stream branch is received and the association table containing the correspondence between stream branches and operation modules is referenced to determine the operation modules corresponding to the certain stream branch. In step 804, the DLLs called by the unused operation modules are unloaded.

Specifically, in step 802, the received triggering signal is first analyzed. In an embodiment of the present invention, the triggering signal is sent from the trigger generated by the compiler. For the exemplary streaming program code shown in FIG. 2, if the triggering signal is SG1, the stream branch T1 is indicated. Then the association table shown in FIG. 5 is referenced to obtain the operation modules and connection relationships involved in branch T1. Specifically, the operation modules P2 and P4 are no longer needed in stream branch T1. Therefore DLL2 and DLL4, which are called by P2 and P4 respectively, can be unloaded in step 804. In order to execute the unloading of the DLLs, a terminating command can be sent to operation modules P2 and P4, and a unloading function, for example dll.close( ), can be called to unload DLL2 and DLL4. Similarly, if the triggering signal is SG2, then stream branch T2 is indicated. The needed operation modules corresponding to stream branch T2 can be obtained by referencing the association table. Furthermore, the DLLs called by the unnecessary operation modules can be unloaded by sending these modules a terminating command. Therefore control over the DLLs is realized through the user-defined rules.

Figure 9:
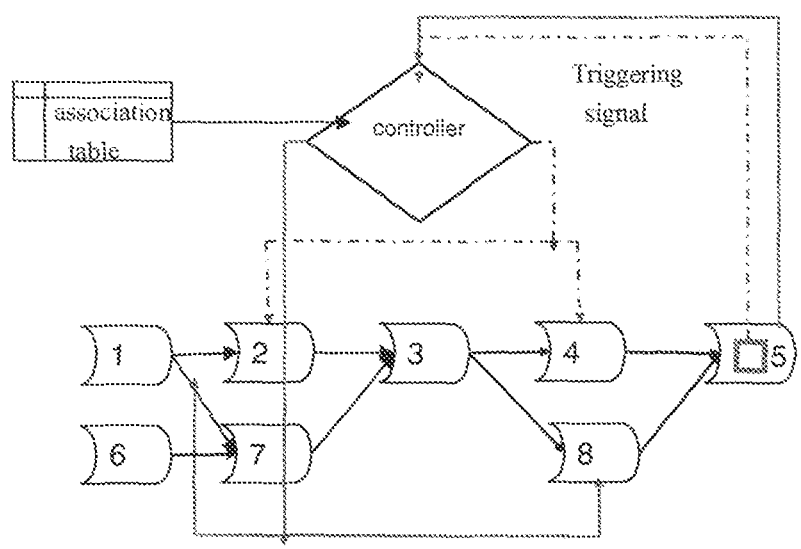
FIG. 9 shows the control scheme of the controller on the operation modules.

FIG. 9 shows a diagram of the controller on the operation modules in a streaming program. FIG. 9 is essentially FIG. 3 with an added controller outside the operation modules of the streaming program. The controller can be generated by a compiler or can be realized by a section of fixed codes. As shown in FIG. 9, during the execution of the streaming program, the controller reads the triggering signal from the trigger embedded in operation module 5, and then generates an association table and a controlling instruction according to the triggering signal. For example, when the received triggering signal is SG1, the controller sends a DLL unloading command to operation modules P2 and P4, as shown in dashed line. When the received triggering signal is SG2, the controller sends the DLL unloading command to operation module P8 as shown in solid line.

It can be understood that the compiler in FIG. 1 and the controller in FIG. 6 can be used to execute the compiling method in FIG. 7 and the method of controlling loading status of DLLs in FIG. 8 respectively. Therefore, the user is able to freely control the loading of DLLs by defining the controlling rules, thereby freeing computing resources.

Those skilled in the art will recognize that the above-mentioned compiler, controller and the methods thereof can be practiced by executable instructions, controlling codes in the processors (e.g. codes in mediums like disks, CDs or DVD-ROMs), memories like ROM or EPROM, or carriers like optical or electronic signal carriers. The compiler, controller and their units in the embodiments of the present invention can be realized using hardware like VLSI or Gates and Arrays (e.g. semiconductors such as Logic Chip, transistors). In addition, the compiler, controller and their units in the embodiments of the present invention can also be realized using programmable hardware equipment (e.g. FPGA, programmable logic equipments), software executed by different kinds of processors, or the integration of the hardware and software.

The above-described exemplary embodiments are intended to be illustrative in all respects of the method and apparatus for controlling the loading status of DLLs, rather than restrictive of the present invention. Those skilled in the art should recognize that the present invention is capable of many variations and modifications within the scope and spirit of the present invention. The scope of the present invention is defined only by the appended claims.

The invention claimed is:

1. A streaming program compiler for compiling a streaming program, said compiler comprising:
   an association table generating unit configured to generate an association table stored on a computer readable storage medium according to a rule, wherein said association table includes an entry indicating (i) a stream branch of said streaming program and (ii) an operation module corresponding to said stream branch; and
   a trigger generating unit comprising a processor configured to generate a trigger based on said rule, wherein said trigger generating unit (i) determines which condition for loading and unloading dynamic link libraries fits said streaming program, (ii) matches said condition to a particular stream branch to identify a matched stream branch, and (iii) sends out a triggering signal indicating the matched stream branch.

2. The compiler according to claim 1, wherein said rule includes a user-defined rule included in said streaming program.

3. The compiler according to claim 1, wherein said matched stream branch comprises a plurality of operation modules.

4. The compiler according to claim 3, wherein at least one of said plurality of operation modules are required by said matched stream branch.

5. The compiler according to claim 3, wherein at least one of said plurality of operation modules are not required by said matched stream branch.

6. The compiler according claim 1, further comprising a controller generating unit for generating a controller wherein said controller (i) refers said association table with said particular stream branch indicated by said triggering signal to determine an unnecessary operation module corresponding to said particular stream branch, and (ii) unloads a DLL called by said unnecessary operation module.

7. The compiler according to claim 1, wherein said trigger generating unit is further configured to embed said trigger into said operation module.

8. A controller for controlling the loading status of a dynamic link library (DLL) in a streaming program, said controller comprising:
   an operation module determining unit comprising a processor configured to (i) receive a triggering signal indicating a stream branch and (ii) reference an association table stored on a computer readable storage medium with said stream branch to determine an unnecessary operation module which corresponds to said stream branch; and
   a DLL controlling unit configured to unload a DLL called by said unnecessary operation module.

9. The controller according to claim 8, wherein said association table has recorded correspondence between said stream branch and said unnecessary operation module.

10. The controller according to claim 9, wherein said association table is (i) generated according a user-defined rule and (ii) comprised of an entry which indicates a stream branch of said streaming program and an operation module which corresponds to said stream branch.

11. The controller according to claim 8, wherein said DLL controlling unit sends a terminating command to said unnecessary operation module and unloads said DLL by calling a terminating function.

12. The controller according to claim 8, wherein said triggering signal is generated by (i) determining which condition for loading and unloading dynamic link libraries fits said streaming program and (ii) matching said condition to said stream branch.

13. A method of controlling the loading status of a dynamic link library (DLL) in a streaming program, said method comprising the steps of:

receiving a triggering signal identifying a stream branch;

determining an unnecessary operation module which corresponds to said stream branch by referring to an association table stored on a computer readable storage medium; and unloading a DLL called by said unnecessary operation module.

14. The method according to claim 13, wherein said triggering signal is generated by determining which condition for loading and unloading DLLs fits said streaming program, and matching said condition to said stream branch.

15. The method according to claim 13, wherein said association table has recorded correspondence between said stream branch and said unnecessary operation module.

16. The method according to claim 15, wherein said association table is (i) generated according a user-defined rule and (ii) includes an entry which indicates a stream branch of said streaming program and an operation module which corresponds to said stream branch.

17. The method according to claim 13, wherein the step of unloading said DLL called by said unnecessary operation module comprises:

sending a terminating command to said unnecessary operation module; and calling a terminating function to unload said DLL.

\* \* \* \* \*